United States Patent
Okano et al.

(10) Patent No.: US 11,486,894 B2
(45) Date of Patent: Nov. 1, 2022

(54) CALIBRATION APPARATUS AND CALIBRATION METHOD

(71) Applicant: CANON KABUSHIKI KAISHA, Tokyo (JP)

(72) Inventors: Yu Okano, Kanagawa (JP); Kazuki Takemoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/168,312

(22) Filed: Feb. 5, 2021

(65) Prior Publication Data

US 2021/0247420 A1 Aug. 12, 2021

(30) Foreign Application Priority Data

Feb. 12, 2020 (JP) .............................. JP2020-021878

(51) Int. Cl.
*G01P 21/00* (2006.01)
*G01P 15/02* (2013.01)

(52) U.S. Cl.
CPC .............. *G01P 21/00* (2013.01); *G01P 15/02* (2013.01)

(58) Field of Classification Search
CPC ...................................................... G01P 21/00
See application file for complete search history.

(56) References Cited

U.S. PATENT DOCUMENTS

| 10,236,971 B2 | 3/2019 | Ui et al. |
| 2015/0371444 A1 | 12/2015 | Hara et al. |
| 2018/0267074 A1* | 9/2018 | Keal ........................ G01P 13/00 |

FOREIGN PATENT DOCUMENTS

JP 2012037405 A 2/2012

OTHER PUBLICATIONS

Valenti et al., "Keeping a Good Attitude: A Quaternion-Based Orientation Filter for IMUs and MARGs" Sensors (Aug. 2015) pp. 1-29.

* cited by examiner

*Primary Examiner* — Walter L Lindsay, Jr.
*Assistant Examiner* — Andrew V Do
(74) *Attorney, Agent, or Firm* — Carter, DeLuca & Farrell LLP

(57) ABSTRACT

A calibration apparatus of an inertial sensor, obtains an angular velocity value from the inertial sensor, derives a distribution of a difference between temporally adjacent angular velocity values concerning a plurality of angular velocity values obtained during a given period, and determines, based on the distribution, whether the inertial sensor is in a motionless state during the given period. Then, if it is determined that the inertial sensor is in the motionless state, the calibration apparatus decides a bias value of the inertial sensor based on the plurality of angular velocity values and corrects the obtained angular velocity value based on the bias value.

8 Claims, 7 Drawing Sheets

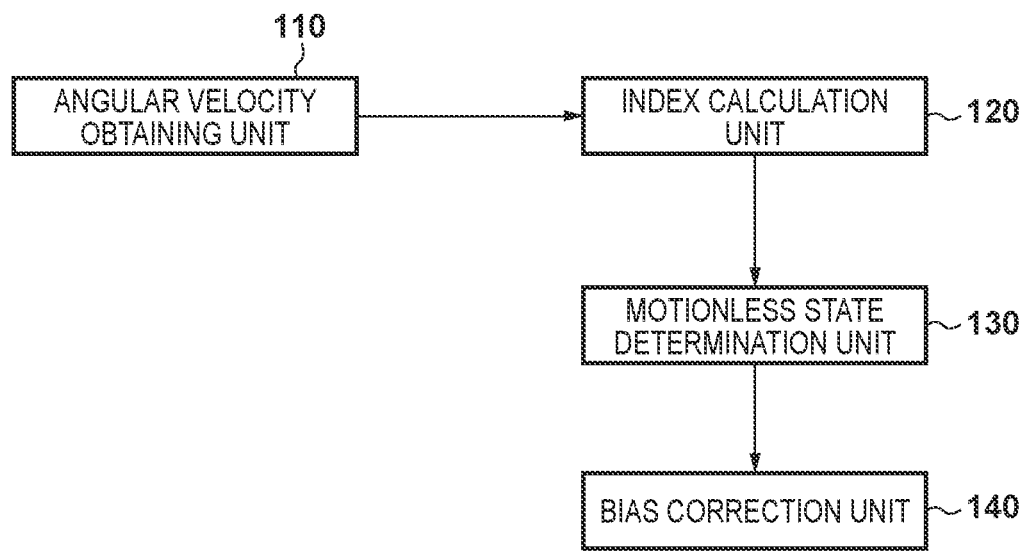
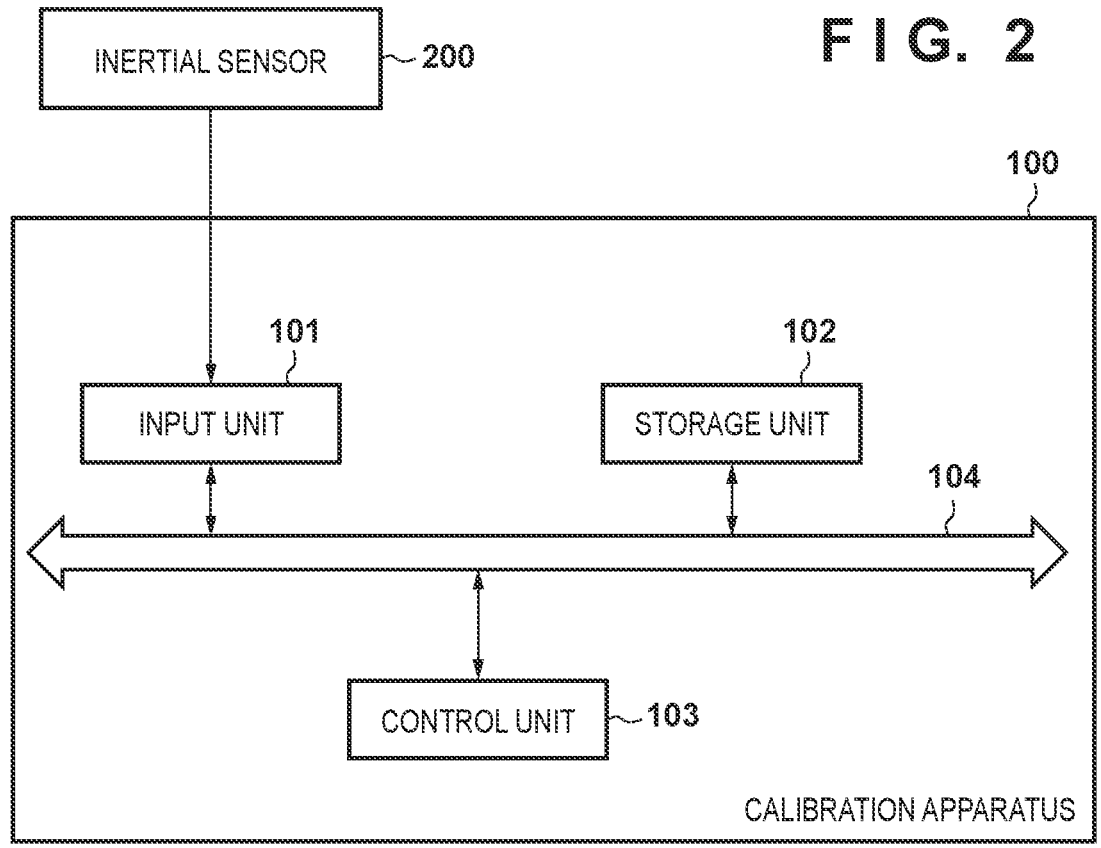

FIG. 4
| time[s] | $\omega_x$[deg/s] | $\omega_y$[deg/s] | $\omega_z$[deg/s] |
|---|---|---|---|
| 0.005 | -0.043 | -0.011 | 0.009 |
| 0.010 | -0.036 | -0.011 | 0.011 |
| 0.015 | -0.033 | -0.011 | 0.013 |
| 0.020 | -0.034 | -0.011 | 0.013 |
| 0.025 | -0.039 | -0.011 | 0.012 |
| 0.030 | -0.045 | -0.012 | 0.012 |
| ... | ... | ... | ... |
221, 222, 223, 224
FIG. 5
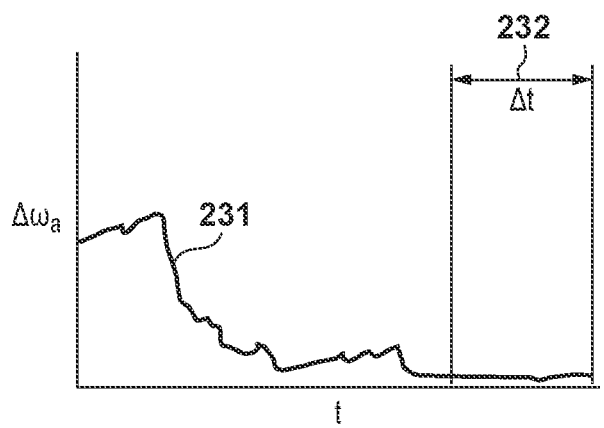
FIG. 6
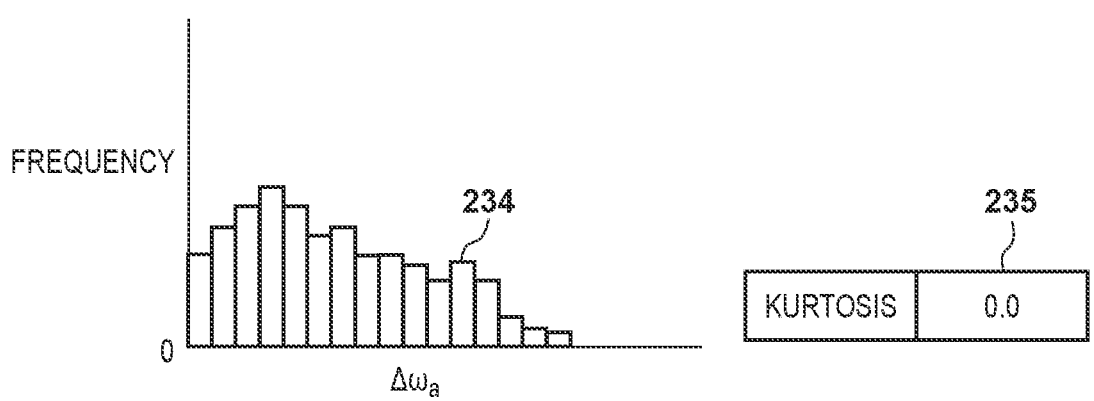

FIG. 8
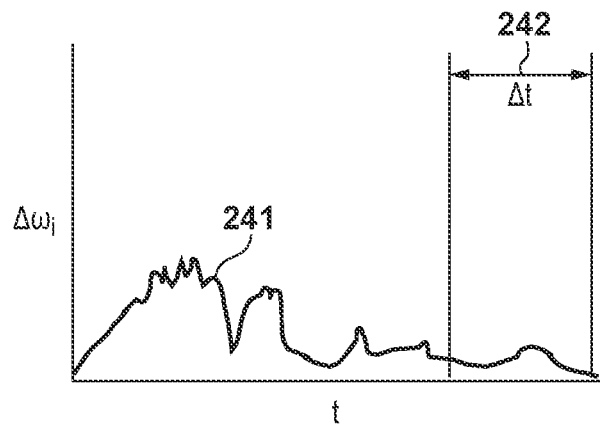
FIG. 9
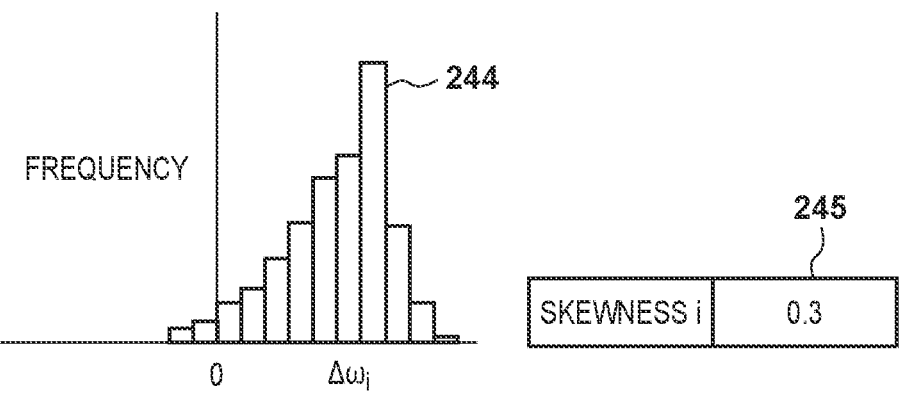
FIG. 10
| KURTOSIS |
|---|
| -0.1 |
| -0.2 |
| 0.0 |
| 0.2 |
| 0.1 |
238
FIG. 11
| SKEWNESS |
|---|
| -0.1 |
| 0.3 |
| 0.1 |
| 0.7 |
| 0.5 |
248

CALIBRATION APPARATUS AND CALIBRATION METHOD

BACKGROUND OF THE INVENTION

Field of the Invention

The present invention relates to calibration of an inertial sensor.

Description of the Related Art

An inertial sensor (IMU: Inertial Measurement Unit) is used for an application purpose of measuring/controlling the behavior of a moving body, and mounted in a camera, a game device, a vehicle, or the like. In recent years, inertial sensors are broadly employed in electronic devices for implementing VR (Virtual Reality) or MR (Mixed Reality). An inertial sensor includes an angular velocity (Gyro) sensor and an acceleration sensor, and outputs an angular velocity and an acceleration. It is generally known that these values output from the inertial sensor include errors.

An error can be modeled using "gain" and "bias". Japanese Patent Laid-Open No. 2012-37405 describes that a motionless state is determined when the composite acceleration of a 3-axis acceleration sensor almost matches a gravitational acceleration, and a bias value is updated using an angular velocity value during the period in which the motionless state is determined. In addition, "Valenti et al., "Keeping a Good Attitude: A Quaternion-Based Orientation Filter for IMUs and MARGs", Sensors, 2015" describes that a motionless state is determined if each of the difference between the 3-axis composite component of an acceleration and a gravitational acceleration, the difference between the preceding angular velocity value and the current angular velocity value of each axis, and the current angular velocity value of each axis after subtraction of a bias value is equal to or smaller than a threshold.

However, the acceleration or angular velocity obtained by the inertial sensor is affected by a temperature change, an atmospheric pressure change, a vibration, an impact, and the like. This also affects correction accuracy, and in some cases, it may be impossible to obtain a correction result of satisfactory accuracy for a user.

SUMMARY OF THE INVENTION

According to one aspect of the present invention, a calibration apparatus of an inertial sensor, comprises: an obtaining unit configured to obtain an angular velocity value from the inertial sensor; a deriving unit configured to derive a distribution of a difference between temporally adjacent angular velocity values concerning a plurality of angular velocity values obtained by the obtaining unit during a given period; a determination unit configured to determine, based on the distribution, whether the inertial sensor is in a motionless state during the given period; and a correction unit configured to, if it is determined by the determination unit that the inertial sensor is in the motionless state, decide a bias value of the inertial sensor based on the plurality of angular velocity values and correct the obtained angular velocity value based on the bias value.

The present invention more suitable implements calibration of an inertial sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the functional arrangement of an inertial sensor according to the first embodiment;

FIG. 2 is a block diagram showing the hardware arrangement of the inertial sensor;

FIG. 4 is a view showing an example of angular velocity information obtained by an angular velocity obtaining unit;

FIG. 5 is a view showing an example of a time-series change of the composite component of angular velocity differences and a time window;

FIG. 6 is a view showing an example of a kurtosis and the frequency distribution of composite components in the time window;

FIG. 8 is a view showing an example of a time-series change of an angular velocity difference and a time window:

FIG. 9 is a view showing an example of a skewness and the frequency distribution of angular velocity difference in the time window:

FIG. 10 is a view showing a list of kurtoses used in smoothing processing;

FIG. 11 is a view showing a list of skewnesses used in smoothing processing;

DESCRIPTION OF THE EMBODIMENTS

Figure 3:
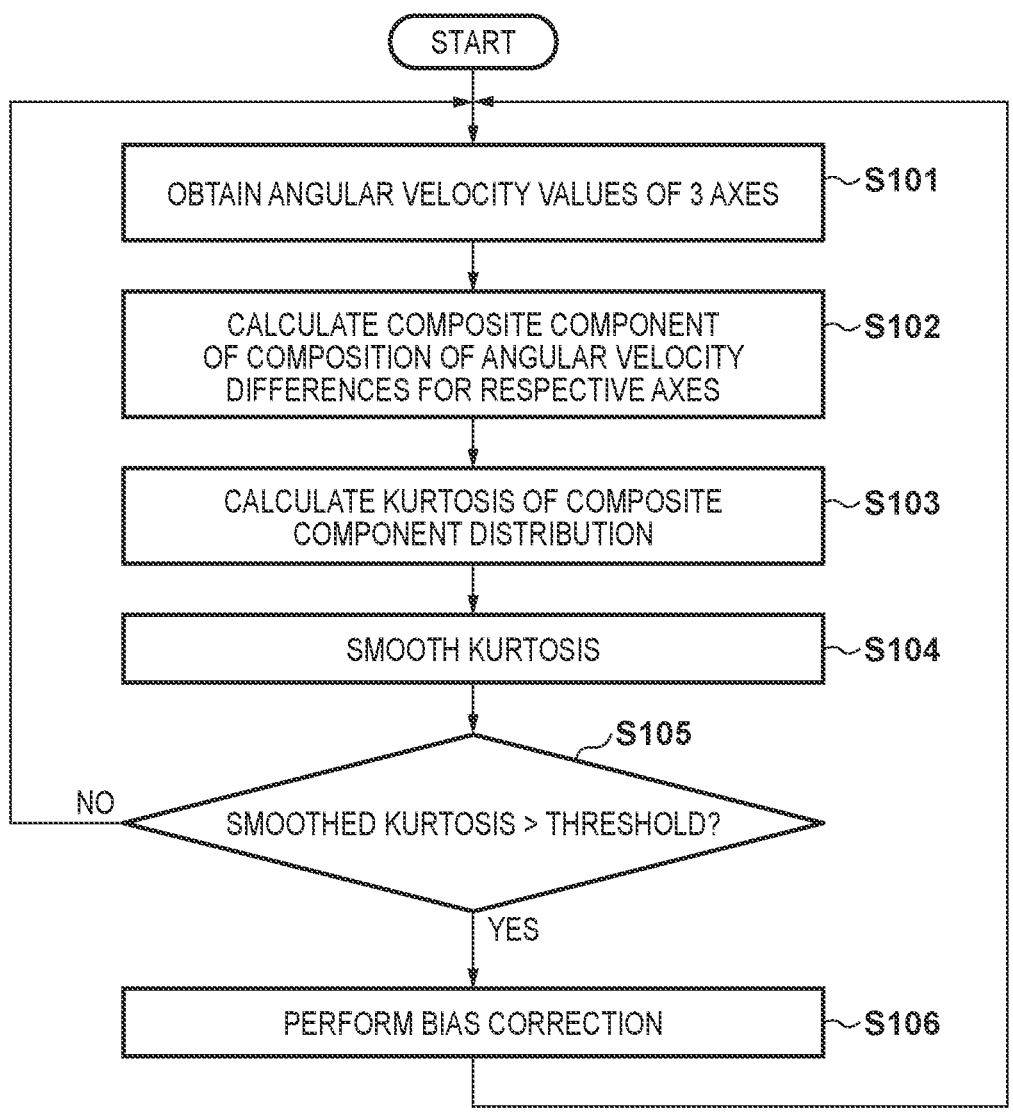
FIG. 3 is a flowchart showing the operation of the inertial sensor according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

As a calibration apparatus according to the first embodiment of the present invention, a calibration apparatus that performs bias correction of an inertial sensor will be described below as an example.

<Calibration of Inertial Sensor>

An error included in the output value of an inertial sensor can be modeled using "gain (g)" and "bias (b)" by an angular velocity value ω' after correction $$\omega' = \omega g - b \qquad (1)$$

where ω is an obtained angular velocity value.

An error caused by a gain is derived from the fact that a sensor outputs an amount (scale) different from an actual momentum. For example, assume that an angular velocity value "60" is output from the inertial sensor. Assume that the inertial sensor is actually moving with an angular velocity value "30". In this case, the gain value of the angular velocity is "2". An error caused by a bias is derived from the fact that an angular velocity value output from an angular velocity sensor has a predetermined offset. For example, if an inertial sensor in a motionless state obtains an angular velocity value far apart from "0" by measurement, the inertial sensor outputs an angular velocity value to which a bias value is added.

Hence, bias correction is used in which an angular velocity value according to an actual movement is obtained by subtracting a bias value from an angular velocity value obtained by measurement. Bias correction is also called offset correction, zero-rate correction, or zero-motion calculation. In particular, an angular velocity value obtained in the motionless state can be considered as equivalent to a bias value. Hence, it is widely practiced that the inertial sensor is made to stand still for a predetermined time, angular velocities during the time are measured, and an average is calculated as a bias value.

In general, calibration of an angular velocity value using a bias value and a gain value is performed in accordance with equation (1). Note that if angular velocities are output concerning a plurality of axes (for example, three axes), a gain value and a bias value are calculated for each axis.

In many cases, bias correction is executed by the user every time use of the inertial sensor is started, or every time the user feels a deviation in a posture value. This is because the output characteristic of the inertial sensor changes due to a temperature, an atmospheric pressure, an external vibration, an impact, and the like, and the bias value changes. However, there is a problem that it is cumbersome for the user to perform an operation for bias correction or determine the necessity of bias correction. It is therefore demanded that bias correction is automatically performed without making the user conscious of it.

An inertial sensor configured to suitably detect, by monitoring the output value of the inertial sensor, that the inertial sensor is in a motionless state and perform bias correction will be described below.

<Apparatus Arrangement>

FIG. 1 is a block diagram showing the functional arrangement of a calibration apparatus 100 according to the first embodiment. The calibration apparatus 100 includes an angular velocity obtaining unit 110, an index calculation unit 120, a motionless state determination unit 130, and a bias correction unit 140. FIG. 2 is a block diagram showing the hardware arrangement of the calibration apparatus 100. The calibration apparatus 100 includes an input unit 101, a storage unit 102, a control unit 103, and a bus 104. As shown in FIG. 2, the angular velocity obtaining unit 110 corresponds to an inertial sensor 200 that detects/measures an angular velocity. The index calculation unit 120, the motionless state determination unit 130, and the bias correction unit 140 correspond to the calibration apparatus 100. The calibration apparatus 100 is an apparatus that receives an output (angular velocity value) from the inertial sensor 200 and performs calibration processing. Note that the calibration apparatus 100 and the inertial sensor 200 are shown as separate devices in FIG. 2 but may be an integrated component (for example, a head mounted display).

The angular velocity obtaining unit 110 receives and obtains an angular velocity value output from the inertial sensor 200. The inertial sensor 200 is installed in an object (for example, a head mounted display) of a measurement target, and periodically (for example, every 5 ms) measures and outputs an angular velocity in the installation place. In the following description, it is assumed that the inertial sensor 20 is configured to measure the angular velocities (yaw, pitch, and roll) of three axes (X, Y, and Z). However, the inertial sensor 200 need only be able to output an angular velocity value of at least one axis. The output value from the inertial sensor 200 is a coded (digitized) value of an angular velocity. For the descriptive convenience, assume that the output value of the inertial sensor 200 is an angular velocity value expressed in a unit "deg/s". Note that the angular velocity obtaining unit 110 may immediately give the obtained angular velocity value to the index calculation unit 120, or may temporarily store the angular velocity value in a buffer (not shown) and then give it.

The index calculation unit 120 continuously receives an angular velocity value from the angular velocity obtaining unit 110, and derives an index value based on a plurality of angular velocity values. Here, the index value is a value representing the feature of the histogram distribution of the difference (Δ angular velocity value) between angular velocity values that are temporally adjacent in a predetermined time window. Details will be described later with reference to FIGS. 5 and 6.

The motionless state determination unit 130 determines, using the index value calculated by the index calculation unit 120, whether the portion where the inertial sensor 200 is installed is in a motionless state (stand still with respect to the inertial system). More specifically, the motionless state determination unit 130 determines, based on whether the index value obtained from the index calculation unit 120 satisfies a predetermined condition, whether the portion is in a motionless state, and outputs the determination result.

The bias correction unit 140 performs processing of removing a bias value included in an angular velocity value output from the inertial sensor 200. First, the bias correction unit 140 decides, as a bias value, the average value, the median, or another statistical representative value of angular velocity values during the period in which the motionless state is determined by the motionless state determination unit 130. The bias correction unit 140 then outputs a value obtained by removing the decided bias value from the angular velocity value.

The input unit 101 is a functional unit that inputs the output value (an angular velocity value or an acceleration value) from the inertial sensor 20 to the calibration apparatus 100. The input unit 101 may also input, to the calibration apparatus 100, a signal from an input device used to input information to the calibration apparatus 100. The input device can include, for example, a pointing device such as a touch sensor that detects a touch of the user, a mouse, or a touch pad. In addition, the input device can include devices of other types such as a keyboard, a keypad, buttons, and switches.

The storage unit 102 is formed by a semiconductor memory (a RAM or a ROM), a hard disk drive (HDD), a solid-state drive (SSD), or the like, and stores programs and data for processing by calibration apparatus 100. The data stored in the storage unit 102 can include, for example, an angular velocity value obtained from the input unit 101, an index value calculated by the control unit 103, and various data to be described later. Note that some of programs and data to be described in this specification can be obtained not from the storage unit 102 but from an external data source (for example, a data server, a network storage, or an external memory).

The control unit 103 is formed by a processor such as a CPU (Central Processing Unit) or a DSP (Digital Signal Processor). The control unit 103 executes programs stored in the storage unit 102 or another storage medium, thereby implementing various processes of the calibration apparatus 100 to be described later.

The bus 104 communicably connects the input unit 101, the storage unit 102, and the control unit 103 to each other. The bus 104 is not limited to wired connection, and may use wireless connection.

<Operation of Apparatus>

FIG. 3 is a flowchart showing the operation of the calibration apparatus 100 according to the first embodiment. Especially, in the first embodiment, a form in which a motionless state is determined based on the kurtosis of the distribution of composite components ($\Delta\omega_a$) that are the composites of $\Delta$ angular velocity values of three axes (X, Y, and Z) will be described. Note that in place of the kurtosis itself, another index (an index that simplifies the kurtosis) representing the degree of sharpness of the distribution may be used.

In step S101, the angular velocity obtaining unit 110 (inertial sensor 200) measures the angular velocities of the three axes, and outputs the angular velocity values of the three axes obtained by measurement to the index calculation unit 120 together with time information. For example, if the updating interval of angular velocity values is set to 200 Hz, the angular velocity values are output every 5 ms. The following loop of steps S101 to S105 is executed every time an angular velocity value is output (that is, every 5 ms).

FIG. 4 is a view showing an example of angular velocity information obtained by the angular velocity obtaining unit 110. An example in which the angular velocity information includes a time stamp 221, an angular velocity ($\omega x$) 222 about the X-axis, an angular velocity ($\omega y$) 223 about the Y-axis, and an angular velocity ($\omega z$) 224 about the Z-axis is shown here. Here, the values of the angular velocities 222 to 224 are expressed using a unit "deg/s". However, the inertial sensor may be configured to output a sensor dependent value. An acceleration sensor dependent value can be converted into a predetermined physical amount (for example, "deg/s") by a conversion formula described in the data sheet of an angular velocity sensor or the like. An example in which acceleration information is output/added every 5 ms is shown here. However, the output interval can freely be set in accordance with an application purpose/the situation of an application.

In step S102, the index calculation unit 120 calculates angular velocity differences ($\Delta\omega_x$, $\Delta\omega_y$, and $\Delta\omega_z$) concerning the axes based on the angular velocity information obtained in step S101. The index calculation unit 120 also calculates a composite component $\Delta\omega_a$ of the differences of the three axes.

In step S103, concerning the composite component $\Delta\omega_a$ calculated in step S102, the index calculation unit 120 derives the distribution in the time window ($\Delta t$) that is a given period, and calculates a kurtosis. Here, the kurtosis is calculated based on data for 1 sec in the past from the current time (the latest time of angular velocity information).

FIG. 5 is a view showing an example of a time-series change of the composite component of angular velocity differences and a time window. The abscissa represents time, and the ordinate represents the magnitude of the composite component of angular velocities. A curve 231 represents a time change of the composite component $\Delta\omega_a$ calculated in step S102. A time window 232 is a time window for the curve 231, and here represents a time section having a width ($\Delta t$) of 1 sec in the past from the current time (the right end of the curve 231). The index calculation unit 120 calculates the kurtosis that is an index value based on the histogram distribution of the magnitudes of a plurality of composite components $\Delta\omega_a$ included in the time window 232.

FIG. 6 is a view showing an example of a kurtosis and the frequency distribution of composite components in the time window. The frequency distribution of $\Delta\omega_a$ during the period of the time window 232 shown in FIG. 5 is shown as a histogram distribution 234. In addition, the value of a kurtosis calculated based on the histogram distribution 234 is shown in a table 235.

The index calculation unit 120 calculates the kurtosis of the composite component $\Delta\omega_a$ by a calculation represented by $$\left\{\frac{n(n+1)}{(n-1)(n-2)(n-3)}\sum\left(\frac{x_i-\bar{x}}{s}\right)^4\right\}-\frac{3(n-1)^2}{(n-2)(n-3)} \quad (2)$$

where n: the number of $\Delta\omega_a$ used to create the histogram $x_i$: the number of appearances (frequency) in the ith section in the histogram $\bar{x}$: the average of $x_i$ s: the standard deviation of $\Delta\omega_a$ included in the time window 232

The calculated kurtosis value is stored in a buffer. Here, assume that five kurtosis values obtained latest are stored in the buffer.

In step S104, the index calculation unit 120 smoothes the kurtoses calculated in step S103. Here, the average of the five kurtosis values obtained latest is calculated.

FIG. 10 is a view showing a list of kurtoses used in smoothing processing. The kurtosis values stored in the list correspond to the above-described five kurtosis values obtained latest and stored in the buffer. For the five kurtosis values of the example shown in FIG. 10, the index calculation unit 120 calculates "0.0" that is the average of the five kurtosis values.

In step S105, the motionless state determination unit 130 determines, using the smoothed index value (kurtosis) calculated in step S104, whether the inertial sensor is in a motionless state. Here, it is determined that the inertial sensor is in the motionless state if a predetermined condition that the smoothed index value is larger than a threshold "−0.5" is satisfied. That is, if the smoothed index value calculated in step S104 is larger than the threshold, "true (=motionless state)" is determined, and the process advances to step S106. If the smoothed index value is equal to or smaller than the threshold, "false" is determined, and the process returns to step S101. Hence, if the smoothed index value is calculated as "0.0", true is determined, and the process advances to step S106. Note that the threshold can appropriately beset in accordance with, for example, accuracy needed for the determination.

In step S106, the bias correction unit 140 performs bias correction of the angular velocities obtained in step S101. Here, the bias correction unit 140 decides, as a bias value, a value obtained by averaging pieces of angular velocity information upon determining true in motionless state determination. After that, the bias correction unit 140 calculates a calibrated angular velocity value by subtracting the bias value from the angular velocity value obtained in step S101, and outputs the angular velocity value to an application or platform (not shown).

As described above, according to the first embodiment, the bias value can adaptively/automatically be decided based on the angular velocity value obtained by the inertial sensor 200, and calibration of the inertial sensor 200 can be implemented more suitably. In particular, when the kurtosis of the distribution concerning the composite component $\Delta\omega_a$ of the differences between angular velocity values is used as an index value, it can suitably be determined whether the inertial sensor is in the motionless state.

Second Embodiment

In the second embodiment, a form in which a motionless state is determined based on the skewness of the frequency distribution of angular velocity differences on each rotation axis of an inertial sensor, and bias correction of the inertial sensor is performed will be described. Note that the apparatus arrangement is the same as in the first embodiment, and a description thereof will be omitted.

<Operation of Apparatus>

Figure 7:
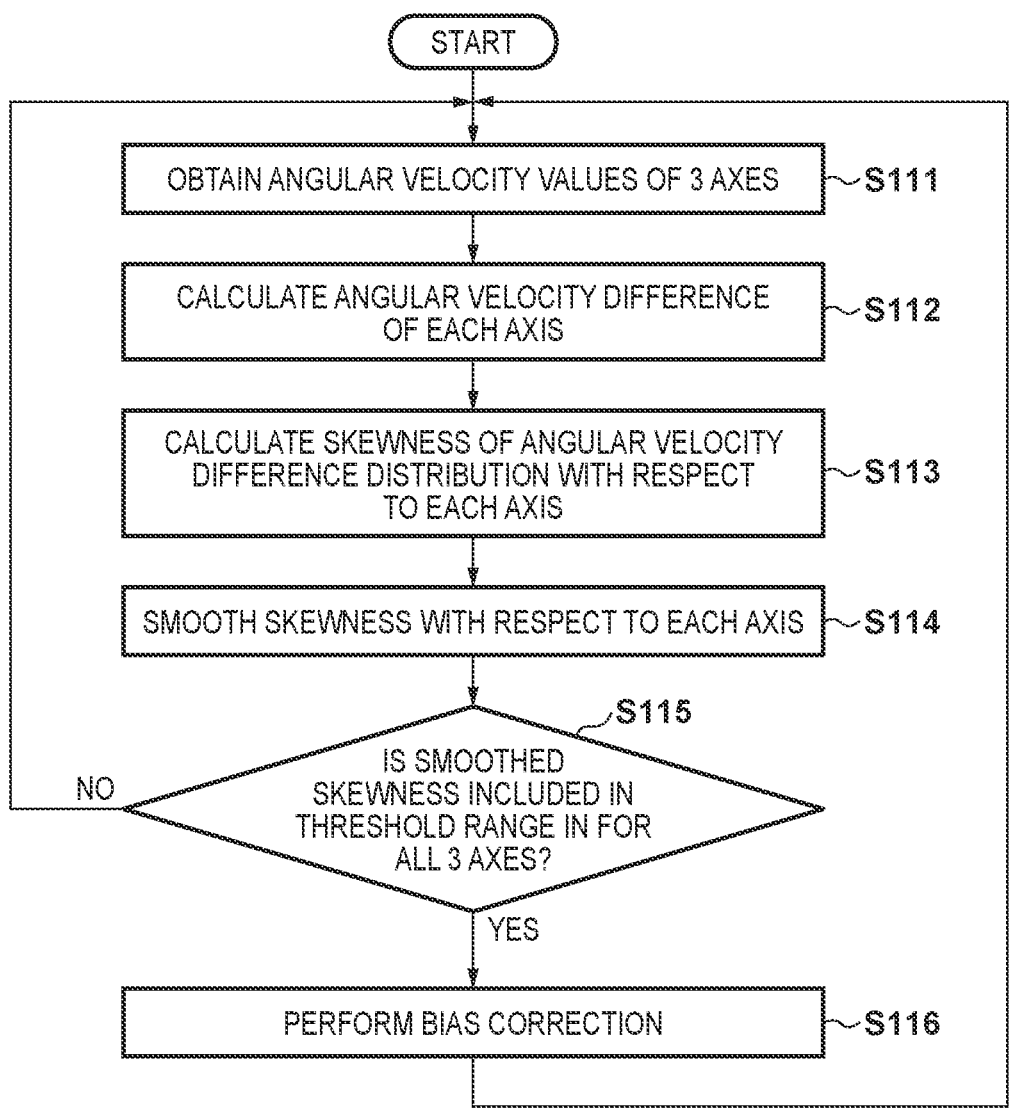
FIG. 7 is a flowchart showing the operation of an inertial sensor according to the second embodiment.

FIG. 7 is a flowchart showing the operation of a calibration apparatus according to the second embodiment. As described above, in the second embodiment, a form in which a motionless state is determined based on the skewness of the distribution of $\Delta$ angular velocity values of three axes (X, Y, and Z) will be described. Note that in place of the skewness itself, another index (an index that simplifies the skewness) representing the degree of asymmetry of the distribution may be used.

In step S111, an angular velocity obtaining unit 110 (inertial sensor 200) measures the angular velocities of the three axes, and outputs the angular velocity values of the three axes obtained by measurement to an index calculation unit 120 together with time information. For example, if the updating interval of angular velocity values is set to 200 Hz, the angular velocity values are output every 5 ms. The following loop of steps S111 to S115 is executed every time an angular velocity value is output (that is, every 5 ms).

In step S112, the index calculation unit 120 calculates an angular velocity difference ($\Delta\omega_i$) concerning each axis based on the angular velocity information obtained in step S111. Here, i corresponds to each of X-, Y-, and Z-axes.

In step S113, concerning the angular velocity difference ($\Delta\omega_i$) calculated in step S112, the index calculation unit 120 derives the distribution in the time window ($\Delta t$) that is a given period, and calculates a skewness. That is, a skewness is calculated for each of the three axes. Here, the skewness is calculated based on data for 1 sec in the past from the current time (the latest time of angular velocity information).

FIG. 8 is a view showing an example of a time-series change of the angular velocity difference and a time window. The abscissa represents time, and the ordinate represents the magnitude of the angular velocity. A time-series change concerning only the X-axis is shown here as an example. The change is similarly calculated even concerning the Y- and Z-axes.

A curve 241 represents a time change of the angular velocity difference ($\Delta\omega_i$) calculated in step S112. A time window 242 is a time window for the curve 241, and here represents a time section having a width ($\Delta t$) of 1 sec in the past from the current time (the right end of the curve 241). The index calculation unit 120 calculates the skewness that is an index value based on the histogram distribution of the magnitudes of a plurality of differences ($\Delta\omega_i$) included in the time window 242.

FIG. 9 is a view showing an example of a skewness and the frequency distribution of angular velocity differences in the time window. The frequency distribution of $\Delta\omega_i$ during the period of the time window 242 shown in FIG. 8 is shown as a histogram distribution 244. In addition, the value of a skewness calculated based on the histogram distribution 244 is shown in a table 245. A frequency distribution and a skewness concerning only the X-axis are shown here as an example. The frequency distribution and the skewness are similarly calculated even concerning the Y- and Z-axes.

The index calculation unit 120 calculates the skewness of the angular velocity difference ($\Delta\omega_i$) by a calculation represented by $$\frac{n}{(n-1)(n-2)} \sum_{i=1}^{n} \left( \frac{x_i - \bar{x}}{s} \right)^3 \quad (3)$$

where
n: the number of $\Delta\omega_i$ used to create the histogram
$x_i$: the number of appearances (frequency) in the ith section in the histogram
$\bar{x}$: the average of $x_i$
s: the standard deviation of $\Delta\omega_i$ included in the time window 242

The calculated skewness value is stored in a buffer for each axes. Here, assume that five skewness values obtained latest are stored in the buffer.

In step S14, the index calculation unit 120 smoothes the skewnesses calculated in step S113. Here, the average of the five skewness values obtained latest is calculated.

FIG. 11 is a view showing a list of z skewnesses used in smoothing processing. The skewness values stored in the list correspond to the above-described five skewness values of the X-axis obtained latest and stored in the buffer. For the five skewness values of the example shown in FIG. 11, the index calculation unit 120 calculates "+0.3" that is the average of the five skewness values.

In step S115, a motionless state determination unit 130 determines, using the smoothed index values (skewnesses) of the three axes calculated in step S114, whether the inertial sensor is in a motionless state. Here, it is determined that the inertial sensor is in the motionless state if a predetermined condition that all the index values are included in a threshold range from "−0.5" to "+0.5" is satisfied. That is, if all the smoothed index values of the three axes calculated in step S114 are included in the threshold range, "true (=motionless state)" is determined, and the process advances to step S116. On the other hand, if the smoothed index value of at least one axis falls outside the threshold range, "false" is determined, and the process returns to step S111. Hence, if the smoothed index value is calculated as "+0.3" for the X-axis, and the smoothed index values fall within the threshold range even for the Y- and Z-axes, true is determined, and the process advances to step S116. Note that the threshold range can appropriately beset in accordance with, for example, accuracy needed for the determination.

In step S116, a bias correction unit 140 performs bias correction of the angular velocities obtained in step S111. Here, the bias correction unit 140 decides, as a bias value, a value obtained by averaging pieces of angular velocity information upon determining true in motionless state determination. After that, the bias correction unit 140 calculates a calibrated angular velocity value by subtracting the bias value from the angular velocity value obtained in step S111, and outputs the angular velocity value to an application or platform (not shown).

As described above, according to the second embodiment, the bias value can adaptively/automatically be decided based on the angular velocity value obtained by the inertial sensor 200, and calibration of the inertial sensor 200 can be implemented more suitably. In particular, when the skewness of the distribution concerning the angular velocity difference of each axis is used as an index value, it can suitably be determined whether the inertial sensor is in the motionless state.

Third Embodiment

In the third embodiment, a form in which an output from an acceleration senor included in an inertial sensor 200 is further used will be described. More specifically, threshold determination based on an acceleration is used in addition to threshold determination based on an angular velocity, thereby more robustly determining the motionless state.

<Apparatus Arrangement>

Figure 12:
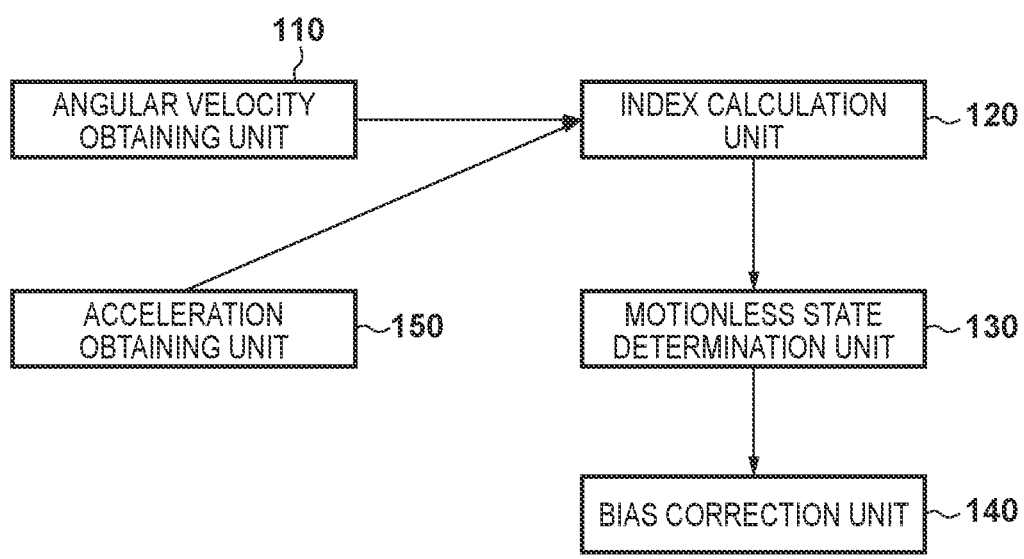
FIG. 12 is a block diagram showing the functional arrangement of an inertial sensor according to the third embodiment.

FIG. 12 is a block diagram showing the functional arrangement of a calibration apparatus according to the third embodiment. An acceleration obtaining unit 150 is added to the functional arrangement (FIG. 1) according to the first embodiment. The remaining constituent elements are the same as in the first embodiment, and a description thereof will be omitted.

The acceleration obtaining unit 150 receives and obtains an acceleration value output from the inertial sensor 200. The inertial sensor 20 periodically measures and outputs an angular velocity, and also periodically measures and outputs an acceleration. In the following description, it is assumed that the inertial sensor 200 is configured to measure the accelerations of three axes (X, Y, and Z) in addition to the angular velocities. The output value from the inertial sensor 200 is a coded (digitized) value of an acceleration. For the descriptive convenience, assume that the output value of the inertial sensor 200 is an acceleration value expressed in a unit "$m/s^2$". Note that the acceleration obtaining unit 150 may immediately give the obtained acceleration value to an index calculation unit 120, or may temporarily store the acceleration value in a buffer (not shown) and then give it.

<Operation of Apparatus>

Figure 13:
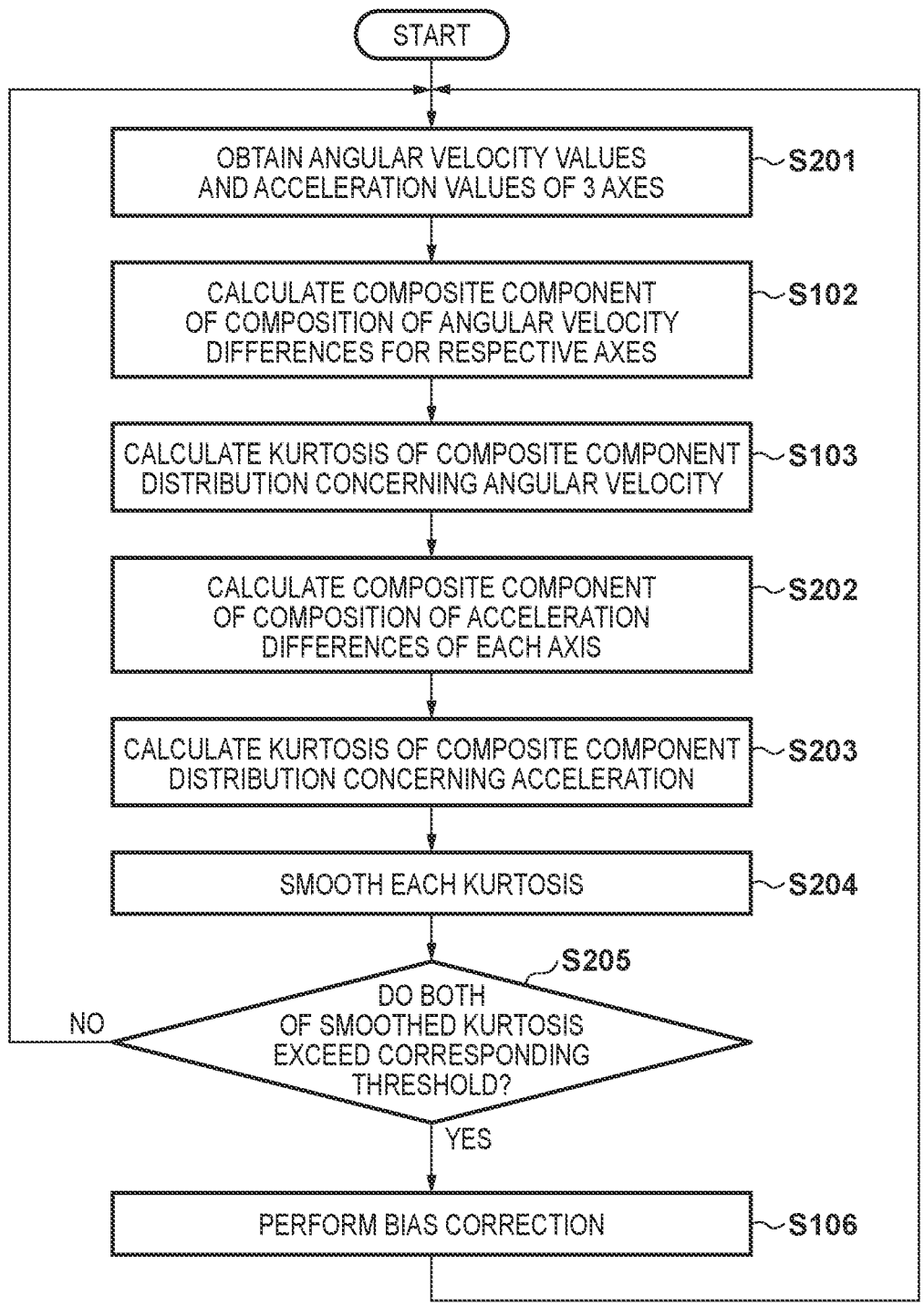
FIG. 13 is a flowchart showing the operation of the inertial sensor according to the third embodiment.

FIG. 13 is a flowchart showing the operation of the calibration apparatus according to the third embodiment. Steps S102, S103, and S106 are the same as in the first embodiment, and a description thereof will be omitted. Note that for the acceleration as well, the kurtosis of a composite component $\Delta A_a$ of differences is calculated, like the angular velocity. In place of the kurtosis itself, another index (an index that simplifies the kurtosis) representing the degree of sharpness of the distribution may be used.

In step S201, an angular velocity obtaining unit 110 (inertial sensor 200) measures the angular velocities of the three axes, and outputs the angular velocity values of the three axes and the acceleration values of the three axes obtained by measurement to the index calculation unit 120 together with time information. For example, if the updating interval of angular velocity values and acceleration values is set to 200 Hz, these values are output every 5 ms. The following loop of steps S201 to S205 is executed every time an angular velocity value and an acceleration value are output (that is, every 5 ms).

In step S202, the index calculation unit 120 calculates acceleration differences ($\Delta A_x$, $\Delta A_y$, and $\Delta A_z$) concerning the axes based on the acceleration information obtained in step S201. The index calculation unit 120 also calculates the composite component $\Delta A_a$ of the differences of the three axes.

In step S203, concerning the composite component $\Delta A_a$ calculated in step S202, the index calculation unit 120 calculates the kurtosis of the distribution in a time window ($\Delta t$) that is a given period. Here, the kurtosis is calculated based on data for 1 sec in the past from the current time (the latest time of angular velocity information).

In step S204, the index calculation unit 120 smoothes the kurtoses calculated in step S103 and the kurtoses calculated in step S203. Here, concerning each of the angular velocity and the acceleration, the average of the five kurtosis values obtained latest is calculated.

In step S205, a motionless state determination unit 130 determines, using the smoothed index value (kurtosis) calculated in step S204 concerning each of the angular velocity and the acceleration, whether the inertial sensor is in a motionless state. As in step S105 of the first embodiment, if the smoothed index value calculated in step S204 is larger than a threshold, "true (=motionless state)" is determined. If the smoothed index value is equal to or smaller than the threshold, "false" is determined. If true is determined for both smoothed index values concerning the angular velocity and the acceleration, the process advances to step S106. If false is determined for at least one of them, the process returns to step S201.

As described above, according to the third embodiment, the bias value can adaptively/automatically be decided based on the angular velocity value and the acceleration value obtained by the inertial sensor 200, and calibration of the inertial sensor 200 can be implemented more suitably. In particular, as compared to the first embodiment, since two measured values of different characteristics, that is, an angular velocity and an acceleration are used, it is possible to more robustly determine the motionless state.

(Modifications)

There are many different targets to fix and install the inertial sensor 200 in accordance with application purposes. For example, a camera, a game controller, a vehicle interior, an HMD (Head Mounted Display) configured to implement VR or MR, and the like can be used. For example, the inertial sensor 200 may be fixed and installed in an HMD, and the processing described in the above embodiments may be executed sequentially while measuring the position and orientation of the head of a user who wears the HMD by the inertial sensor 200, thereby implementing calibration of the inertial sensor 200.

Furthermore, the index value calculation method is not limited to the calculation method described in the above embodiments. An index value may be calculated in addition to another information obtained from the outside of the calibration apparatus 100 as well. For example, if the HMD measures the orientation by image processing/use of another sensor independently of the angular velocity obtaining unit 110, an index value may be calculated using the measured orientation. More specifically, an index value is calculated by processing similar to that described in the above embodiments based on the information of the measured orientation and added to an index value obtained from the angular velocity obtaining unit 110, thereby determining the motionless state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-021878, filed Feb. 12, 2020 which is hereby incorporated by reference herein in its entirety.

What is claimed is:

1. A calibration apparatus of an inertial sensor, comprising:
   an obtaining unit configured to obtain an angular velocity value from the inertial sensor;
   a deriving unit configured to derive a distribution of a difference between temporally adjacent angular velocity values concerning a plurality of angular velocity values obtained by the obtaining unit during a given period;
   a determination unit configured to determine, based on the distribution, whether the inertial sensor is in a motionless state during the given period; and
   a correction unit configured to, if it is determined by the determination unit that the inertial sensor is in the motionless state, decide a bias value of the inertial sensor based on the plurality of angular velocity values and correct the obtained angular velocity value based on the bias value,
   wherein the obtaining unit obtains the plurality of angular velocity values of three axes from the inertial sensor,
   concerning the plurality of angular velocity values of the three axes obtained by the obtaining unit during the given period, the deriving unit calculates a difference between temporally adjacent angular velocity values for each of the three axes, calculates a composite component of differences of the three axes, and calculates a kurtosis of a distribution of the composite components during the given period, and
   if the kurtosis is larger than a threshold, the determination unit determines that the inertial sensor is in the motionless state.

2. The apparatus according to claim 1, wherein the obtaining unit is configured to obtain the angular velocity value at a predetermined period, and
   the given period is a period corresponding to a predetermined latest time from a current time.

3. The apparatus according to claim 1, further comprising:
   a second obtaining unit configured to obtain acceleration values of the three axes from the inertial sensor; and
   a second deriving unit configured to, concerning a plurality of acceleration values of the three axes obtained by the second obtaining unit during the given period, calculate a difference between temporally adjacent acceleration values for each of the three axes, calculate a second composite component for the differences of the acceleration values of the three axes, and calculate a second kurtosis of a distribution of the second composite components during the given period,
   wherein if the kurtosis is larger than the threshold, and the second kurtosis is larger than a second threshold, the determination unit determines that the inertial sensor is in the motionless state.

4. The apparatus according to claim 1, wherein the deriving unit is configured to calculate a plurality of kurtosises, and
   the determination unit determines, based on whether an index value obtained by smoothing the plurality of kurtosises satisfies a predetermined condition, whether the inertial sensor is in the motionless state.

5. The apparatus according to claim 4, wherein the determination unit calculates an average of the plurality of kurtosises as the index value.

6. A calibration apparatus of an inertial sensor, comprising:
   an obtaining unit configured to obtain an angular velocity value from the inertial sensor;
   a deriving unit configured to derive a distribution of a difference between temporally adjacent angular velocity values concerning a plurality of angular velocity values obtained by the obtaining unit during a given period;
   a determination unit configured to determine, based on the distribution, whether the inertial sensor is in a motionless state during the given period; and
   a correction unit configured to, if it is determined by the determination unit that the inertial sensor is in the motionless state, decide a bias value of the inertial sensor based on the plurality of angular velocity values and correct the obtained angular velocity value based on the bias value,
   wherein the obtaining unit obtains the plurality of angular velocity values of three axes from the inertial sensor,
   concerning the plurality of angular velocity values of the three axes obtained by the obtaining unit during the given period, the deriving unit calculates a difference between temporally adjacent angular velocity values for each of the three axes, and calculates a skewness of a distribution of each of the differences of the angular velocity values of the three axes during the given period, and
   if all the skewnesses of the three axes fall within a threshold range, the determination unit determines that the inertial sensor is in the motionless state.

7. A method of calibrating an inertial sensor, comprising:
   obtaining an angular velocity value from the inertial sensor;
   deriving a distribution of a difference between temporally adjacent angular velocity values concerning a plurality of angular velocity values obtained in the obtaining during a given period;
   determining, based on the distribution, whether the inertial sensor is in a motionless state during the given period; and if it is determined in the determining that the inertial sensor is in the motionless state, deciding a bias value of the inertial sensor based on the plurality of angular velocity values and correcting the obtained angular velocity value based on the bias value, wherein the plurality of angular velocity values of three axes are obtained from the inertial sensor, concerning the obtained plurality of angular velocity values of the three axes during the given period, a difference is calculated between temporally adjacent angular velocity values for each of the three axes, a composite component of differences of the three axes is calculated, and a kurtosis of a distribution of the composite components is calculated during the given period, and if the kurtosis is larger than a threshold, it is determined that the inertial sensor is in the motionless state.

8. A non-transitory computer-readable recording medium storing a program for causing a computer to execute a calibration method of an inertial sensor, comprising:

obtaining an angular velocity value from the inertial sensor;

deriving a distribution of a difference between temporally adjacent angular velocity values concerning a plurality of angular velocity values obtained in the obtaining during a given period;

determining, based on the distribution, whether the inertial sensor is in a motionless state during the given period; and if it is determined in the determining that the inertial sensor is in the motionless state, deciding a bias value of the inertial sensor based on the plurality of angular velocity values and correcting the obtained angular velocity value based on the bias value, wherein the plurality of angular velocity values of three axes are obtained from the inertial sensor, concerning the obtained plurality of angular velocity values of the three axes during the given period, a difference is calculated between temporally adjacent angular velocity values for each of the three axes, a composite component of differences of the three axes is calculated, and a kurtosis of a distribution of the composite components is calculated during the given period, and if the kurtosis is larger than a threshold, it is determined that the inertial sensor is in the motionless state.

* * * * *